Patented May 27, 1930

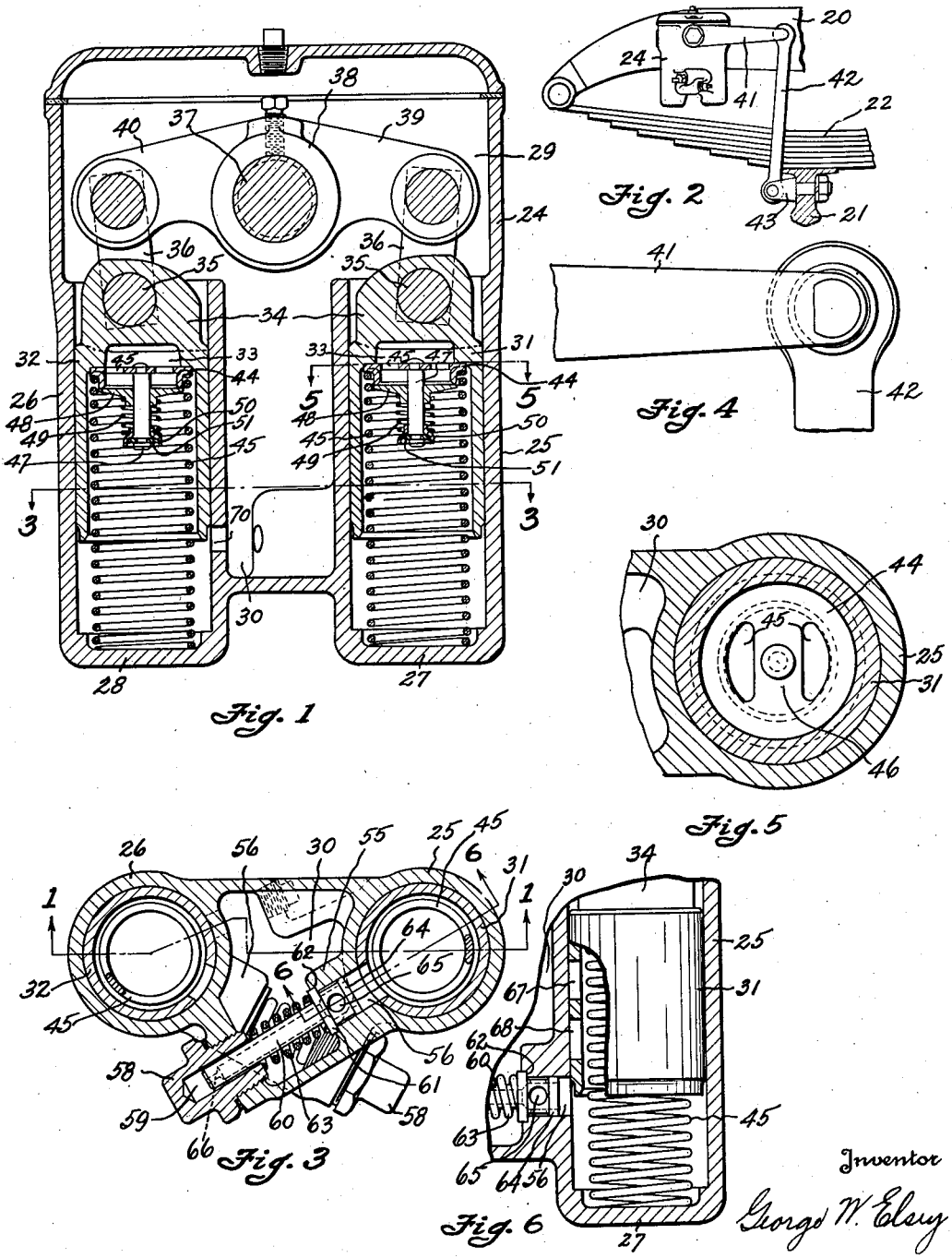

1,759,895

UNITED STATES PATENT OFFICE

GEORGE W. ELSEY, OF ANDERSON, INDIANA, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed November 21, 1927. Serial No. 234,673.

This invention relates to improvements in shock absorbers for cushioning the movement of two relatively movable members, for example the frame and axle of an automotive vehicle.

It is among the objects of the present invention to provide a shock absorber of simple and compact construction for resisting the approaching movement of the frame and axle of a vehicle, as well as for retarding the movement of separation of said frame and axle.

Further objects and advantages of the present invention will be apparent from the following description, reference being had to the accompanying drawings, wherein a preferred embodiment of one form of the present invention is clearly shown.

In the drawings:

Fig. 1 is a vertical sectional view of the shock absorber taken on line 1—1 of Fig. 3, showing the various elements thereof in normal position.

Fig. 2 is a fragmentary detail side view, at reduced scale, showing the application of the shock absorber to a vehicle frame and axle.

Fig. 3 is a transverse sectional view taken along the line 3—3 of Fig. 1.

Fig. 4 is a fragmentary view showing the swivel connection between the lever arm of the shock absorber and the connecting rod adapted to connect the shock absorber with the axle.

Fig. 5 is a fragmentary sectional view taken along the line 5—5 of Fig. 1.

Fig. 6 is a fragmentary view, partly in section, taken along the line 6—6 of Fig. 3.

Referring to the drawings, the two relatively movable members comprise the vehicle frame 20 and the axle 21. A spring 22 is mounted upon the axle 21, said spring supporting the frame 20 upon said axle.

The shock absorber comprises a casing 24 provided with lugs (not shown) by means of which said casing is adapted to be secured to the frame 20 of the vehicle. The casing presents two cylinders 25 and 26 having closed ends 27 and 28 respectively, the open ends of said cylinder communicating with a common fluid chamber 29. Pistons 31 and 32 are reciprocally mounted on the respective cylinders 25 and 26. The head of each piston has an opening 33, bridged by a lug 34, and each of said lugs carries a cross pin 35 to which is pivoted one end of a link 36. A rocker shaft 37 is journalled in the casing 24, said rocker shaft carrying a rocker arm hub 38, within the casing, so as to be rotatable with said shaft. The rocker arm hub 38 has oppositely disposed levers 39 and 40 extending therefrom, the free end of the lever 39 having the link 36 of piston 31 pivotally secured thereto, and the free end of the lever 40 has the link 36 of the piston 32 pivotally secured thereto. On the outside of the casing 24 the rocker shaft 37 is secured to a lever arm 41, the free end of which is swivelly connected with one end of a connecting rod 42, the other end of said rod being swivelly connected to a bracket 43 secured to the axle 21. From this it may be seen that pistons 31 and 32 are operatively connected with the axle 21 so that when the axle 21 is moved to approach the vehicle frame 20, the connecting rod 42 and lever arm 41 will rotate the rocker shaft 37 counterclockwise, the lever 40, through its link 36, pushing the piston 32 downwardly toward the closed end 28 of its cylinder 26, while the lever arm 39, through its link 36, will pull the piston 31 upwardly, away from the closed end 27 of its cylinder 25. The separating movement of the axle 21 from frame 20 will cause a reverse motion of the pistons 31 and 32.

Each piston 31 and 32 is provided with a valve structure for controlling the flow of fluid through their respective passages 33, and inasmuch as both valve structures are identical, only one of them will be described. In the inner or bottom surface of the piston head there is provided an annular seat surrounding the passage 33, into which the flange of a valve seat member 44 is adapted to fit. The valve seat member 44 is held in constant engagement with this seat by means of a spring 45, interposed between the valve seat member 44 and the end wall of the respective cylinder, said spring tending to assist the rocker arm 39 or 40 to move its respective pistons 31 or 32 upwardly in its cylinder away from the end wall thereof. The valve seat member has two passages 45 arranged on diametrically opposite sides of a center portion 46, said center portion carrying a depending pin 47, coaxial of the skirt of the piston. The pin 47 slidably supports the valve plate 48 which is normally maintained in engagement with the valve seat member 44 by a coiled spring 49 which surrounds the pin 47, one end of said spring engages the valve plate 48, the other rests upon an abutment cup 50 maintained upon the pin 47 by a C-washer 51. The valve, including the valve seat member 44 and the valve plate 48, is so constructed and arranged that when piston 31 is moved upwardly by the approaching movement of the axle 21 toward the frame 20, a free flow of fluid will obtain from the fluid chamber 29 through passages 33 and 45 into the cylinder 25 while on the other hand when the piston 31 is moved downwardly toward the closed end 27 of its cylinder, said valve will close tightly to prevent any fluid from passing through the piston into the fluid chamber.

A pair of oppositely disposed angular lugs 55 and 56 are formed integral with the cylinders 25 and 26 respectively, said lugs extending into the portion 30 of the fluid chamber 29. In each of these lugs there is provided a passage 56 forming communications between each cylinder portion beneath its respective piston and the fluid chamber portion 30. These lugs 55 and 56 are superposed, the lug 56 lying beneath the lug 55 to permit application of check valves, to be described. Inasmuch as each cylinder is provided with similar check valves for their corresponding passages 56, the check valve of cylinder 25 only will be described.

In a wall of the casing there is provided a screw threaded aperture, in coaxial alignment with the passage 56 of cylinder 25, adapted to receive a plug 58, provided with a recess 59, also in coaxial alignment with passage 56. The check valve comprises a valve stem 60, having one end slidably extending into the recess 59, the other end of said valve stem having a flange forming a valve member 61 adapted to engage the valve seat 62 formed in the wall of cylinder 25 around the passage 56. A coiled spring 63 surrounding the valve stem 60 is interposed between the flange 61 and the plug 59 and normally holds the valve member 61 in engagement with its seat 62. A tubular extension 64 slidably fits into the passage 56, said tubular extension being provided with transverse passages 65 which communicate with a longitudinal passage provided throughout the major length of the check valve. An orifice 66 is provided at the end of the valve stem 60 extending into the recess 59, said orifice providing a restricted connection between the recess 59 and the longitudinal passage of the valve stem 50. In Fig. 3 it may be seen that the diameter of the valve stem 60 is slightly less than the diameter of the recess 59, thereby permitting fluid to escape between the outer wall of the valve stem and the inner wall of the recess 59 of plug 58.

Both pistons 31 and 32 are provided with apertures designated by the numerals 67 and 68, as shown in Fig. 6. These apertures control the passage of fluid from the cylinder into the passage 56 as the piston moves downwardly into its cylinder.

In addition to the discharge passage 56, cylinder 26 is provided with an exhaust port 70, which, as shown in Fig. 1, is fully open when the piston 32 is in its normal position. However, as said piston 32 moves downwardly into its cylinder 26, said port will be gradually closed by the skirt of the piston, thereby gradually, increasingly restricting the escape of fluid from the cylinder 26 through said port 70 into the fluid chamber portion 30 and thus the movement of said piston 32 will be gradually, increasingly resisted.

The present device has been provided for the purpose of preventing abnormal movement between the axle 21 and the frame 20 which results in shocks to the body of the vehicle supported on the frame. When the road wheels of the vehicle strike a comparatively small obstruction in the road, the spring 22 will be moved slightly toward the frame 20, thus causing a slight counter-clockwise rotation of the rocker shaft 37, thereby causing the rocker arm 40 to move its piston 32 a slight distance downwardly into its cylinder 26 and the rocker arm 39 to move its piston 31 upwardly a slight distance in its cylinder 25. This slight movement of the piston 32 downwardly into its cylinder 26 will not tend to compress the fluid beneath the said piston to a substantial degree due to the fact that the fluid may readily escape through the aperture 70 as long as the piston does not substantially cover said aperture. If, however, the road wheels of the vehicle strike a substantial obstruction due to which spring 22 is flexed a considerable distance toward the frame 20, the piston 32 will be moved to cover the aperture 70 and thus substantially compress the fluid beneath said piston, thereby providing a resistance to the movement of the piston and thus cushion the movement of the spring toward the frame. The compressed fluid beneath the piston 32 may under normal conditions escape through its respective check valve by passing through the longitudinal passage of the valve stem 60 through the orifice 66 into the recess 59 and then out into the fluid chamber portion 30. Excessive pressure under the piston 32 will overcome the effect of spring 63 and move the valve 61 off its seat 62 and thus open the passages 65 to the fluid chamber to provide a less restricted communication between the interior of the cylinder and the fluid chamber, and consequently relieving excessive pressure within the cylinder. The construction of the valve member 61 is such that a predetermined pressure is necessary to push it from its seat against the effect of spring 63; however after once it has been moved from its seat, a lesser pressure will maintain it in this open position.

In rotating counter-clockwise to move the piston 32 downwardly into its cylinder 26, as has been described, the rocker shaft 37 will also rotate the arm 39 counter-clockwise, which lifts the piston 30 upwardly moving it away from the end wall 27 of its cylinder 25. Fluid pressure will move the valve member 48 from its seat and thus fluid will flow freely from the fluid chamber through passages 33 and 45 into the cylinder 25. After the spring 22 has reached its limit of travel, it will suddenly reverse in motion, and return to its normal position, while the frame 20 will tend to continue in its upward travel. This condition results in a rebound shock being transmitted to the frame of the vehicle and particularly the body supported on said frame. To prevent such a shock, the separating movement of the two members 21 and 20 is retarded in the following manner: Movement of the member 21 away from the member 20 will cause the connecting rod 42 and the lever arm 41 to rotate the rocker shaft 37 clockwise, thus causing the lever arm 39, with its link 36, to push the piston 31 downwardly into its cylinder toward the closed end 27 thereof, while the arm 40 will lift the piston 32 upwardly in its cylinder 26. The lifting of the piston 32 will open its piston head valve to permit a free flow of fluid from the fluid chamber into the cylinder 26. The movement of the piston 31 downwardly into its cylinder 25 closes the piston head valve, the consequent compression of the fluid in the cylinder 25 resisting the downward travel of the piston. Fluid pressure is relieved by the escape of the fluid through the passage 56, valve stem 60, orifice 66, recess 59 and plug 58 into the fluid chamber portion 30 as long as the said fluid pressure in the cylinder 25 has not exceeded a predetermined degree. If, however, the pressure in cylinder 25 is excessive, due to sudden or quite extensive movements of the axle 21, valve member 61 will be moved from its seat 62 to open passages 65, thereby providing an additional relief passage through which fluid may escape from the cylinder 25 into the fluid chamber portion 30.

One advantage of the present device is the provision of a common fluid chamber adapted to act both as a feeding reservoir and a discharge reservoir for the two cylinders of the shock absorber, one cylinder acting as a bumper for cushioning the approaching movement of the frame and axle when the spring of the vehicle is suddenly flexed, the other cylinder acting as a shock absorbing member adapted to dissipate shocks by gradually retarding the movement of separation of the axle and frame.

While the form of embodiment of the present invention as herein disclosed, constitutes a preferred form, it is to be understood that other forms might be adopted, all coming within the scope of the claim which follows.

What is claimed is as follows:

A device for controlling the movement of two relatively movable members, comprising in combination, a casing secured to one of said movable members and presenting closed end cylinders in communication with a common fluid chamber; pistons reciprocal in said cylinders; means connecting the other relatively movable member with the pistons whereby said pistons are reciprocated in their respective cylinders in accordance with the movement of the relatively movable members; a valve controlled port in the head of each piston, adapted to establish a free flow of fluid from the fluid chamber to the respective cylinders when the pistons in said cylinders are moved upwardly by the connecting means, said ports being closed to the return flow of fluid to the fluid chamber when the movement of the pistons is downwardly; a port in the wall of one cylinder providing communication between said cylinder and the common fluid chamber, said port, however, being closed gradually by the downward movement of the piston in said cylinder to gradually increasingly restrict the escape of fluid from said cylinder; and a separate, spring-loaded, unbalanced valve providing communication between each of the respective cylinders and the common fluid chamber, each valve being adapted to restrict the flow of fluid from the respective cylinder to the comon fluid chamber in response to the downward movement of the piston toward the closed end of its cylinder.

In testimony whereof I hereto affix my signature.

GEORGE W. ELSEY.